Oct. 3, 1967     B. F. VAN VALKENBURGH     3,344,907
DRAPER CHAIN
Filed Oct. 14, 1966
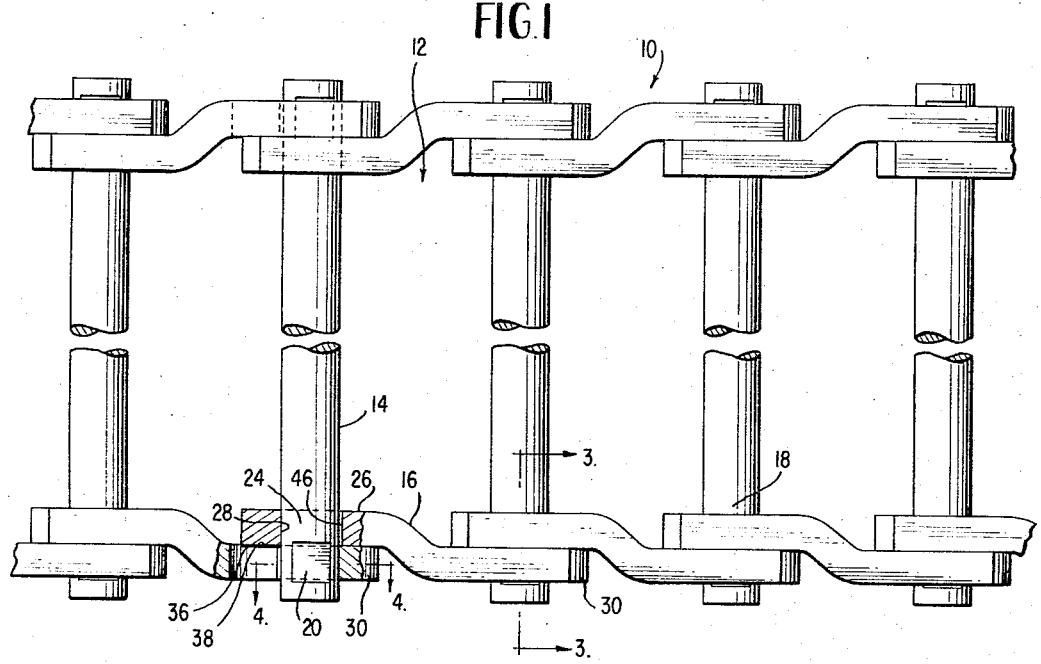
FIG.1
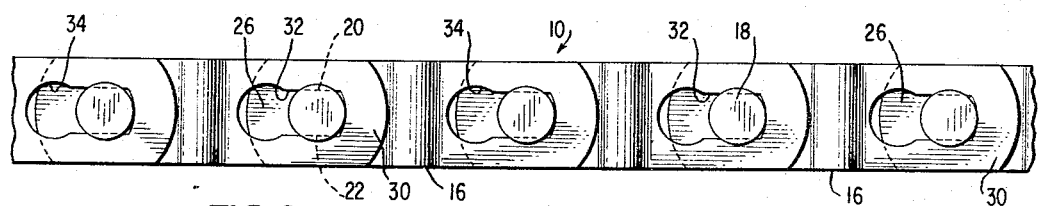
FIG.2
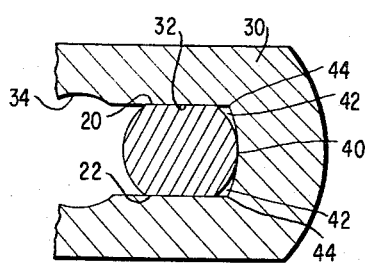
FIG.4
FIG.3
INVENTOR.
BRYCE F. VAN VALKENBURGH
BY
Sughrue, Rothwell, Mion, Zinn & Macpeak
ATTORNEYS United States Patent Office 3,344,907
Patented Oct. 3, 1967

3,344,907
DRAPER CHAIN
Bryce F. Van Valkenburgh, Homewood, Ill., assignor to Rex Chainbelt Inc., Milwaukee, Wis., a corporation of Wisconsin
Filed Oct. 14, 1966, Ser. No. 586,748
3 Claims. (Cl. 198—195)

ABSTRACT OF THE DISCLOSURE

A draper chain having a connection between the transverse rods and linking bars which aids in maintaining the belt self-aligning and free of foreign matter at the point of articulation.

---

This invention relates to improvements in chain conveyors such as used for agricultural equipment and commonly known as a draper chain.

Draper chains are known in the art and are commonly formed with a plurality of links, each of which has a cross rod connected at each end by a pair of end bars. The arrangement is commonly such that the end bars are offset so that one end of each offset bar engages one cross rod and the other end engages an adjacent cross rod. In one known construction the end bars lock at one of their ends on one cross rod and are generally free of rotation at their other end. Draper chains as commonly used on agricultural equipment such as potato harvesters encounter much rough usage. Further, the cross rods are not necessarily straight and are commonly offset or dodged in order to form pockets to nest the material being conveyed. Exemplary prior art on draper chains is shown in U.S. Patents 282,135, 3,160,264 and 3,225,901.

In operation of draper chains in agricultural machinery, the chain or conveyor becomes entangled with vines, weeds and other fibrous and foreign materials. These materials clog the joints between end bars and cross rods and between adjacent end bars and prevent the correct and effective functioning and articulation of the adjacent links of the draper chain. This invention provides a structure utilizing offset ends rods which prevents foreign material from getting between the bars at the ends of the rods by the end bars abutting face to face due to their construction and position on the rods.

Quite often in the use of draper chains, guides are necessary to control the direction of the draper chain since, particularly in certain prior art constructions of draper chain tend to go off from a desired straight line of travel. This invention provides a construction allowing a self centering action of the articulated links of the draper chain when tension or load is applied to the chain in many instances eliminating need for the guides.

As noted above, many times draper chains have their cross rods offset or dodged to provide a trough or pockets to nest material being conveyed. Of course, in such instances, rotation of the rod about its own axis cannot be permitted. With the end bar construction of this invention, the end plates are held tight in a vertical plane preventing rotation of dodged or offset cylindrical rods.

This invention also provides a construction wherein the end bars hold the rods tightly by a drive fit, allowing accurate chain pitch control or spacing of one rod from another.

Other features of the invention will be pointed out in the following description and claims and illustrated in the accompanying drawing, which disclose by way of example, the principle of the invention and the best mode which has been contemplated of applying that principle.

In the drawing:

FIG. 1 is a plan view of a portion of the draper chain with certain components broken away for the sake of clarity;

FIG. 2 is an elevation of the portion of the draper chain shown in FIG. 1;

FIG. 3 is a sectional view taken along line 3—3 of FIG. 1 and slightly enlarged; and FIG. 4 is a sectional view taken long line 4—4 of FIG. 1 and slightly enlarged.

Referring to the drawing, the draper chain 10 of which only a portion is shown, comprises a series of articulated links 12. Each link 12 is identical and includes a cross rod 14 and a side bar 16 assembled on each end of the cross rod.

Each end of cross rod 14 is of identical construction and includes indented, flat parallel surfaces 20 and 22 forming a locking section 18 and a cylindrical bearing surface 24.

Each bar 16 is stamped and is offset as shown so that its respective ends are offset inwardly and outwardly having reference to the centerline of the chain. The inwardly offset bearing end 26 has a round hole 28 therein.

The outwardly offset locking end 30 has a slot 32 of a width corresponding to the distance between parallel surfaces 20 and 22 and an access opening 34 of a diameter slightly greater than the diameter of rod 14. Opening 34 adjoins one end of slot 32 as shown in FIGS. 2 and 4 for insertion of the rod and positioning its locking section 18 in the slot 32.

The surface of bar 16 defining the blind end of slot 32 is of greater curvature than the periphery of the rod 14 in order to create spaces 42 when the rod is seated in the slot 32. These spaces allow for deposit of any displaced material from the bar 16 when the rod 14 is drivingly fitted into slot 32 to ensure that the rod 14 may bottom correctly in the slot but will be sepaced from corners 44 of the slot. That is, each spaced 42 at the end of the drive fit receives any foreign material or material from the bar which may have been removed from either surface or by the had surfaces of the cross rods cutting into the softer side bar. This ensures that bottoming of the rod in the extreme end of the slotted hole 32 in the side bar will be allowed for accurate control of the chain pitch.

The flat surface 20 and 22 or the rod are drive-fit in slot 32 so that the bars are firmly secured against relative rotation. In operation as a conveyor, the two bars 16 assembled on each rod are relatively rigid in a vertical plane. Furthermore, since the bars are tight in the vertical plane, the dodged or offset cross rods 14 also cannot rotate. As mentioned, their offset is for the purpose of nesting material and rotation would allow the material to drop through the chain. It is thus essential that dodged or offset rods be prevented from rotation.

However the flat surfaces 20 and 22 are slightly wider than the width of bars 16 and there is clearance between bearing surface 24 and hole 28 so that some limited amount of relative movement is allowed the bars in a horizontal plane. Accordingly, in the operation of the chain as a conveyor, the outer face 36 of bearing end 26 of each bar 16 can bear against the inner face 38 of locking end 30 of the adjacent bar 16. Such bearing occurs because the plates are offset and chain tension tends to turn each bar so that its offset ends are themselves parallel to the centerline of the chain. This bearing occurs unavoidably in offset chain where the bars are relatively loose. However, such chain is not at all suitable if the rods are dodged or offset and such chain is less than suitable for the various reasons indicated.

The present invention provides chain links having relative looseness only to the degree necessary in only one plane or direction and relative rigidity in another plane or direction. In the initial assembly of each link as described, each rod in effect and to a degree, broaches the slot of the relatively softer bar to provide an accurate fit which is neither too tight or too loose. The bar, of course, has some resilience or spring back and the spaces 42 are important in respect thereto. That is, the inter-engaging areas of the bar and the rod are spaced at least slightly from the corners 44 so that the degree of compression at various distances from corners 44 is more equalized. This provides a more uniformly tight interlock which resists the intrusion of foreign material which promotes a fast wearing of the parts. The tight interlock is thus maintained to provide the chain characteristics described.

In particular, the faces 36 and 38 of the end bar 16 fit snugly against one another and prevents the entry of foreign material. The conveyor will have a self-centering action because the end bars fit snugly against each other with faces 36 and 38 in contact thus eliminating the need for guides.

It has been found that for self-centering action the round hole 28 of the bearing end 26 of the side bar 16 of each link 12 should not fit exactly the respective cylindrical bearing surface 24 of the cross rod 14 of the next adjacent link 12. That is, to prevent a binding action between the bar and the rod on which it is to turn, it may be desirable to provide a clearance as at 46 between the rod and the portion of the hole which is nearer the center of the bar in which the hole is formed. Thus the round hole 28 may instead be slightly elongated or egg-shaped to provide such clearance as at 46.

While the invention has been particularly shown and described with reference to a preferred embodiment thereof, it will be understood by those skilled in the art that various changes in form and details may be made therein without departing from the spirit and scope of the invention.

What is claimed is:
1. A conveyor comprising a series of spaced parallel rods connected at their ends by stamped bars to define a series of articulated links, each end of each of the rods having a pair of flat parallel locking surfaces formed thereon adjacent to but spaced inwardly from said end and a cylindrical bearing surface inwardly of and immediately adjacent to said flat locking surfaces, each of said bars having a flat bearing portion provided with a bore mounted for rotation on the cylindrical bearing surface of a rod and a flat outwardly offset locking portion provided with a generally keyhole shaped slot, said keyhole shaped slot having an enlarged portion adapted to pass over the outermost end of said rod and a reduced portion provided with parallel spaced apart locking surfaces in press fit engagement with said locking surfaces on said rod to prevent rotation of said rod relative to said rod about the axis of said rod but allowing pivotal movement of said bar relative to said rod about an axis transverse to the plane of said locking surfaces, and each of said bars being located on said rods with the outwardly directed surface of the flat bearing portion of each bar disposed in flat bearing engagement with the inwardly directed surface of the flat locking portion of an adjacent bar.

2. A conveyor chain as set forth in claim 1 wherein said bore in each bar is dimensioned relative to said cylindrical bearing surface to provide a clearance between said rod and said bar which is sufficient to allow pivoting of the bar on the rod about an axis transverse to the axis of said rod without binding.

3. A conveyor chain as set forth in claim 1 wherein the surface of said rod intermediate the flat parallel locking surfaces formed thereon is a curved surface having a radius of curvature smaller than the radius of curvature of a curved surface defining the end of the reduced portion of said keyhole shaped slot.

References Cited
UNITED STATES PATENTS 1,687,005  10/1928  Brock           198—189 XR
3,225,901  12/1965  Heinisch       198—189 XR HUGO O. SCHULZ, *Primary Examiner.*

EVON C. BLUNK, *Examiner.*

R. J. HICKEY, *Assistant Examiner.*

UNITED STATES PATENT OFFICE
CERTIFICATE OF CORRECTION

Patent No. 3,344,907 October 3, 1967

Bryce F. Van Valkenburgh

It is hereby certified that error appears in the above numbered patent requiring correction and that the said Letters Patent should read as corrected below.

Column 1, line 43, for "ends" read -- end --; column 2, line 35, for "sepaced" read -- spaced --; line 36, for "spaced" read -- space --; line 39, for "had" read -- hard --; column 3, line 18, before "self-centering" insert -- this --; line 38, before "rods" insert -- said --; column 4, line 10, for "rod", second occurrence, read -- bar --.

Signed and sealed this 12th day of November 1968.

(SEAL)
Attest:

Edward M. Fletcher, Jr.
Attesting Officer

EDWARD J. BRENNER
Commissioner of Patents